US010864982B2

United States Patent
Haas

(10) Patent No.: US 10,864,982 B2
(45) Date of Patent: Dec. 15, 2020

(54) BALLAST BAG

(71) Applicant: Sandbag Store LLC, Las Vegas, NV (US)

(72) Inventor: Christopher Haas, Las Vegas, NV (US)

(73) Assignee: Sandbag Store, LLC, Las Vegas, NV (US)

( * ) Notice: Subject to any disclaimer, the term of this patent is extended or adjusted under 35 U.S.C. 154(b) by 416 days.

(21) Appl. No.: 15/967,424

(22) Filed: Apr. 30, 2018

(65) Prior Publication Data

US 2019/0329869 A1 Oct. 31, 2019

(51) Int. Cl.
*B64C 17/08* (2006.01)
*B64B 1/70* (2006.01)

(52) U.S. Cl.
CPC ............... *B64C 17/08* (2013.01); *B64B 1/70* (2013.01)

(58) Field of Classification Search
CPC .. A63B 21/0603; B65D 33/005; B65D 33/06; B65D 31/04; B64B 1/70; B64C 17/08
See application file for complete search history.

(56) References Cited

U.S. PATENT DOCUMENTS

| 2,047,095 | A | * | 7/1936 | Booth | B65D 29/00 |
| | | | | | 383/18 |
| 5,584,599 | A | * | 12/1996 | Knittel | E02B 3/108 |
| | | | | | 383/18 |
| 6,149,555 | A | * | 11/2000 | Kinback | A63B 21/06 |
| | | | | | 383/10 |
| 7,891,914 | B2 | * | 2/2011 | Smallwood | E02D 17/202 |
| | | | | | 405/302.6 |
| 10,293,201 | B2 | * | 5/2019 | Tomellini | A63B 21/075 |
| 10,343,009 | B2 | * | 7/2019 | Peyton | A63B 21/072 |
| D868,182 | S | * | 11/2019 | Catania | A63B 21/0603 |
| | | | | | D21/662 |
| 10,561,886 | B2 | * | 2/2020 | Bassoo | A63B 69/0093 |
| 2015/0202486 | A1 | * | 7/2015 | Childs | A63B 21/0603 |
| | | | | | 482/106 |
| 2019/0299046 | A1 | * | 10/2019 | Tomellini | A63B 21/0603 |

OTHER PUBLICATIONS

Lowering Products Shot Bags, https://shotbags.com/, accessed Mar. 28, 2018, 7 pages.
Flight Mechanic, "The Use of Ballast", http://www.flight-mechanic.com/the-use-of-ballast/, accessed Mar. 28, 2018, 4 pages.
Wake Ballast, "25lb Steel shot bag : Light Grip-photo/production studio Free shipping USA only", https://wakeballast.com/25lb-steel-shot-bag-light-grip-photo-production-. . . , accessed Mar. 28, 2018, 4 pages.

* cited by examiner

*Primary Examiner* — Brian M O'Hara
*Assistant Examiner* — Michael B. Kreiner
(74) *Attorney, Agent, or Firm* — Weide & Miller, Ltd.

(57) ABSTRACT

A ballast bag that is durable and prevents exposure to FOD is provided. The ballast bag includes a bag body with a first end and a second end, a first side and a second side, and a front side and a rear side. A first strap is connected to the front side forming a loop defined by two parallel lines along the front side of the bag and a handle extending past each end of the bag. A second strap is connected to the rear side forming a loop defined by two parallel lines along the rear side of the bag and a handle extending past each end of the bag. The handles of the straps are the same size to form a double handle on each end of the bag. The first and second strap each have an inner and outer band of embedded non-slip material.

18 Claims, 3 Drawing Sheets

BALLAST BAG

BACKGROUND

The disclosed embodiments relate to weight ballasts. More specifically, the disclosed embodiments relate to weight ballast bags for aircraft balancing.

Ballast is used in an aircraft to attain a desired center of gravity balance when the center of gravity is not within limits or is not at the location desired by the operator. Any ballast required is usually placed as far aft or as far forward as possible to bring the center of gravity within limits while using a minimum amount of weight. Ballast that is installed to compensate for the removal or installation of equipment items and that is to remain in the aircraft for long periods is called permanent ballast. Permanent ballast is generally in the form of lead bars or plates bolted to the aircraft structure. The installation of permanent ballast results in an increase in the aircraft empty weight, and it reduces the useful load.

Temporary ballast, or removable ballast, is used to meet certain loading conditions that may vary from time to time. It generally takes the form of lead shot bags, sand bags, or other weight items that are not permanently installed. The baggage compartment of an aircraft is an example of a convenient location for temporary ballast.

Whenever permanent or temporary ballast is installed, it must be placed in an approved location and secured in an appropriate manner. If permanent ballast is being bolted to the structure of the aircraft, the location must be one that was previously approved and designed for the installation, or it must be approved by the FAA as a major alteration before the aircraft is returned to service. When temporary ballast is placed in a baggage compartment, it must be secured in a way that prevents it from becoming a projectile if the aircraft encounters turbulence or an unusual flight attitude.

Other uses for ballast bags may include structural testing for aircraft components. Ballast bags are often stacked to achieve a target pounds-per-square-foot of downward force during structural testing on a given aircraft component. For example, in some instances maintenance personnel may need to simulate full fuel tanks within a wing before inspecting for structural cracks. Ballast bags may be used and stacked on the wing in order to simulate the weight of the full fuel tank.

Typical ballast bags such as shot bags or sand bags have several drawbacks. For example, such bags may be difficult to handle and to secure to provide temporary ballast to an aircraft. In testing application, the bags may not stack securely, or may be in risk of falling on maintenance personnel, such as when stacked on a curved wing surface. Further, as the bags wear out, there is a risk that the contents of the bags will be released. The shot or sand from the bag creates a mess for operators and in some implementations is a source of foreign objects and debris (FOD) that could potentially damage aircraft components, resulting in cost and safety hazards.

Thus there is a need for a ballast bag that is easily handled, is durable, and that prevents FOD issues during use.

SUMMARY

Accordingly, a durable, easily handled ballast bag is provided that effectively prevents FOD exposure to a surrounding area. In one embodiment, a ballast bag includes a bag body having a first end and a second end, a first side and a second side, and a front side and a rear side. The bag body may be formed from a single piece of material that is folded along the first side and is connected together along the second side and the first and second ends to form the bag body. The bag body may also have at least one internal layer formed from a contrasting color from an external layer of the bag body. Thus, when then external layer experiences wear, the internal layer is easily noticed by personnel, and the worn ballast bag can be removed from service prior to releasing any material within the ballast bag.

The ballast bag may include a first strap connected to the front side of the bag body. The first strap may be formed from a single strap with ends of the first strap overlapping one another on the front side of the bag body. The strap extends from the overlapping ends in both directions in a first line parallel to the first and second sides. The strap continues past the first and second ends of the bag body and returns to extend along the front side of the bag body in a second line parallel to the first line. The first strap thus forms a handle on each of the first and second ends of the bag body with the portion of the strap that extends past the first and second ends of the bag body.

Similarly, the ballast bag may include a second strap connected to the rear side of the bag body. The second strap may be formed from a single strap with ends of the second strap overlapping one another on the rear side of the bag body. The strap extends from the overlapping ends in both directions in a first line parallel to the first and second sides. The strap continues past the first and second ends of the bag body and returns to extend along the rear side of the bag body in a second line parallel to the first line. The second strap thus forms a handle on each of the first and second ends of the bag body with the portion of the strap that extends past the first and second ends of the bag body. The handles of the second strap and the handles of the first strap are formed to be the same size to form a double handle on each of the first and second ends of the bag body.

In some embodiments, each of the first and second strap have one or more bands of embedded non-slip material extending along the length of the first and second strap. The one or more bands of embedded non-slip material may include an inner band and an outer band extending along the length of the first and second strap.

The strap may be formed from a polypropylene material and the inner and outer bands may be made of rubber. In some embodiments, the first and second strap each have dimensions of 1.5 inches wide and 47.5 inches long. The first and second strap may be connected to the front and rear sides via stitching that is disposed on an outer side of each of the inner and outer band of embedded non-slip material. The first strap and the second strap may be sewn together at the first and second ends of the ballast bag.

The ballast bag may further include reinforcing seams connecting the first and second straps to the front and rear sides of the ballast bag. The reinforcing seams may be disposed perpendicular to the inner and outer bands and parallel to the first and second ends. The reinforcing seams are located on the straps adjacent to the first and second ends. The filler material may be inserted in the first end of the ballast bag, and a double seam may be provided along the first end to close the first end.

In another exemplary embodiment, a ballast bag includes a bag body that has a first end and a second end, a first side and a second side, and a front side and a rear side. A first strap may be connected to the front side of the bag body. The first strap forms a loop in two parallel lines along the front side of the bag and a handle extending past each of the first end and the second end of the bag connecting to the two parallel lines.

A second strap may be connected to the rear side of the bag body. The second strap may form a loop in two parallel lines along the rear side of the bag and a handle extending past each of the first end and the second end of the bag connecting the two parallel lines. The handles of the second strap and the handles of the first strap may be the same size to form a double handle on each of the first and second ends of the bag body. Filler material is disposed within the bag body.

The first and second strap may each include an inner band and an outer band of embedded non-slip material extending along the length of the first and second strap. The first and second strap may be connected to the front and rear sides of the bag body via stitching that is disposed on an outer side of each of the inner and outer bands of embedded non-slip material. In some cases, the first strap and the second strap are sewn together at the first and second ends of the bag body.

Reinforcing seams may connect the first and second straps to the front and rear sides of the ballast bag. The reinforcing seams are disposed perpendicular to the inner and outer bands and parallel to the first and second ends adjacent to the first and second ends.

The ballast bag may be formed from a single piece of material that is folded along the first side and is connected along the second side and the first and second ends. The ballast bag may include at least one internal layer formed from a contrasting color from an external layer of the bag body.

The first and second straps may each be formed from a single strap with ends of the first and second strap overlapping one another on the front side and rear side of the bag body, respectively. The first and second straps may be formed from a polypropylene material and the inner and outer bands of embedded non-slip material may be comprised of rubber. The first and second strap may each have dimensions of 1.5 inches wide and 47.5 inches long.

In some embodiments, the filler material may be inserted in the first end, and a double seam is provided along the first end to close the first end. The ballast bag may be a square shape where the first and second sides and the first and second ends have a length of twelve inches. The parallel lines of the loops formed by the first and second straps may be spaced two and a half inches from the first and second sides, respectively.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
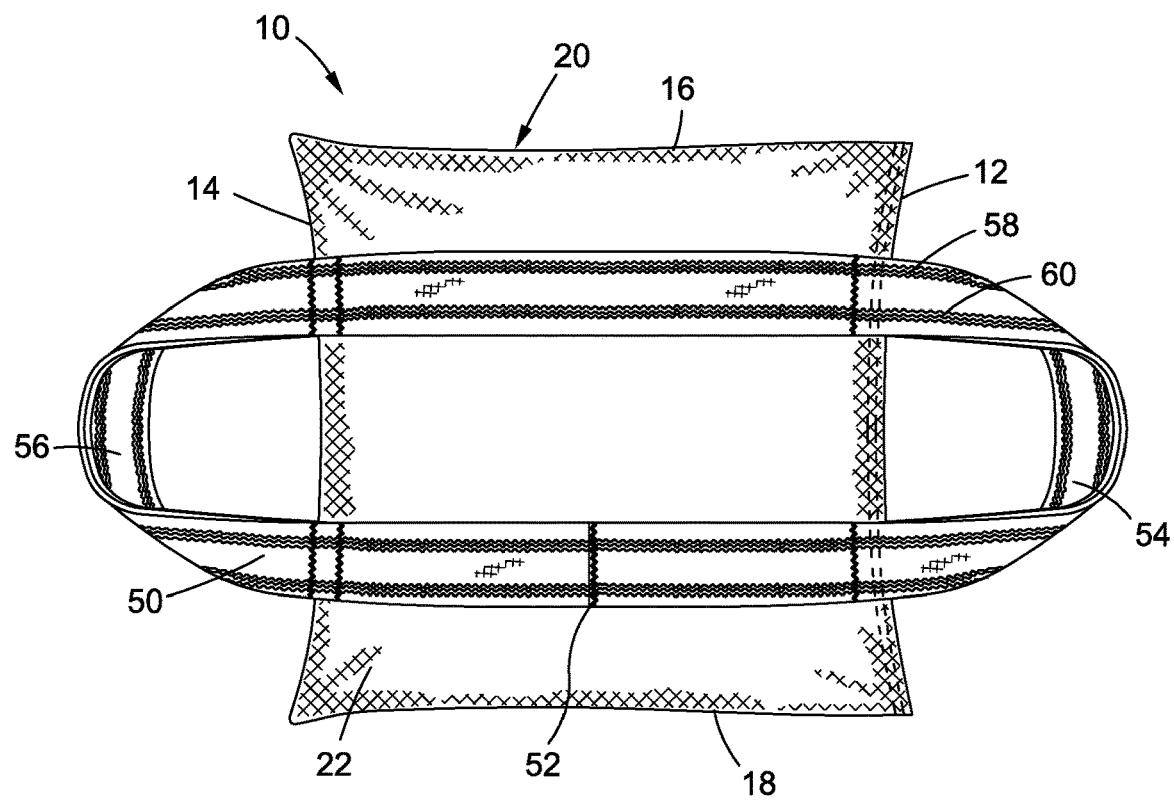
FIG. 1 is a front view of a ballast bag according to an exemplary embodiment.

FIG. 1 is a front view of a ballast bag according to an exemplary embodiment. In FIG. 1, a ballast bag 10 is formed having a square shape. In this embodiment, the ballast bag is a twelve-inch by twelve-inch bag. Other shapes of course, may also be used, and the square shaped ballast bag 10 is exemplary.

The ballast bag 10 may be formed from any suitable material with sufficient strength and durability. In this embodiment, the ballast bag is formed from a durable nylon material. For example, a 1000 denier nylon or nylon blend material is used to form the ballast bag 10. This material may be more commonly known under the trade name COR-DURA® (e.g. 1000D CORDURA material). Other materials having sufficient durability and strength may also be used.

The ballast bag 10 includes a first end 12 and a second end 14 opposite the first end 12, a first side 16 and a second side 18 opposite the first side 16, and a rear side 20 and a front side 22 opposite the rear side 20. The ballast bag 10 may be formed from a single piece of material that is folded over and connected at the edges. For example, the material may be folded along the first side 16 and connected along the second end 14 and the second side 18 by sewing along the second end 14 and the second side 18. Once filling material 40 (FIG. 5) is put into the ballast bag 10, the first end 12 may also be sewn together to close the ballast bag 10.

In the example twelve-inch by twelve-inch bag, the blank material may have dimensions of 13.5 inches by 25.5 inches. The material is folded over at the seams in order to create a clean look and provide a strong seam, resulting in the 12-inch by 12-inch ballast bag 10. Of course, as mentioned above, the ballast bag may take on other sizes and shapes. In some embodiments, the ballast bag 10 may be formed from two pieces of materials forming the rear side 20 and the front side 22, with seams at each of the first and second ends 12, 14 and the first and second sides 16, 18.

To provide for stability during use and to facilitate transportation of the ballast bag 10, straps 50 are provided on the ballast bag 10. The straps 50 are formed from any suitable material with sufficient strength and durability. In this embodiment, the straps are formed from a polypropylene material. The straps 50 are connected to both the rear side 20 and the front side 22 of the ballast bag 10 and extend beyond the first and second ends 12, 14 to form handles 54, 56 at each end 12, 14.

The straps 50 on each of the rear and front sides 20, 22 may be formed from a single strap. In this exemplary embodiment, the strap used is 47.5 inches long and 1.5 inches wide. On the front side 22 shown in FIG. 1, the ends of the strap 50 are connected and sewn to the front side 22 via seam 52. The strap 50 extends in both directions from seam 52 forming a handle 54, 56 at each end 12, 14, and then running parallel to itself along the front side 22. Thus, the strap 50 forms a loop with two parallel lines on the ballast bag 10 and the handles 54, 56 extending past each end 12, 14. In this embodiment, the straps 50 along the rear and front sides 20, 22 are spaced about 2.5 inches from first and second sides 16, 18. However, other arrangements and spacings may also be used.

To create a slip resistant surface, the straps 50 are embedded with a friction enhancing material. Here, the straps 50 include an outer non-slip band 58 and an inner non-slip band 60. The non-slip bands 58, 60 may be formed from a rubber or silicone material that increases the coefficient of friction between the ballast bag 10 and a surface on which the ballast bag 10 rests, or with adjacent ballast bags 1. Here, the outer and inner non-slip bands 58, 60 are embedded in the strap material of the straps 50.

Figure 2:
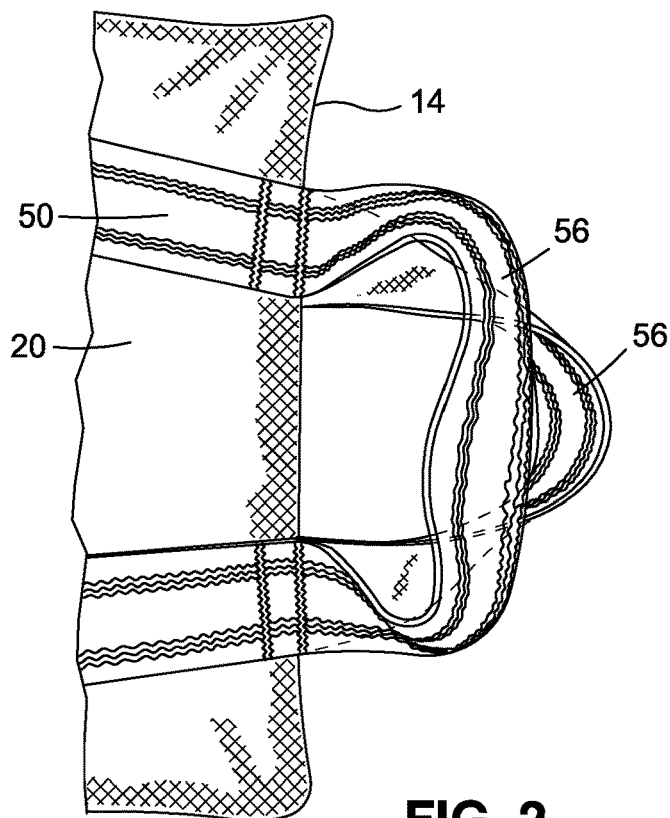
FIG. 2 is an enlarged back view of the ballast bag of FIG. 1.

FIG. 2 is an enlarged back view of the ballast bag of FIG. 1. In FIG. 2, the back side 20 is shown including a strap 50 attached to the back side. The strap 50 along the back side 20 is similar to that shown in FIG. 1 along the front side. The strap 50 along the rear side 20 and the strap 50 along the front side 22 form two handles 56, or a double handle, on each end of the bag 10 (end 14 shown in FIG. 2).

Figure 3:
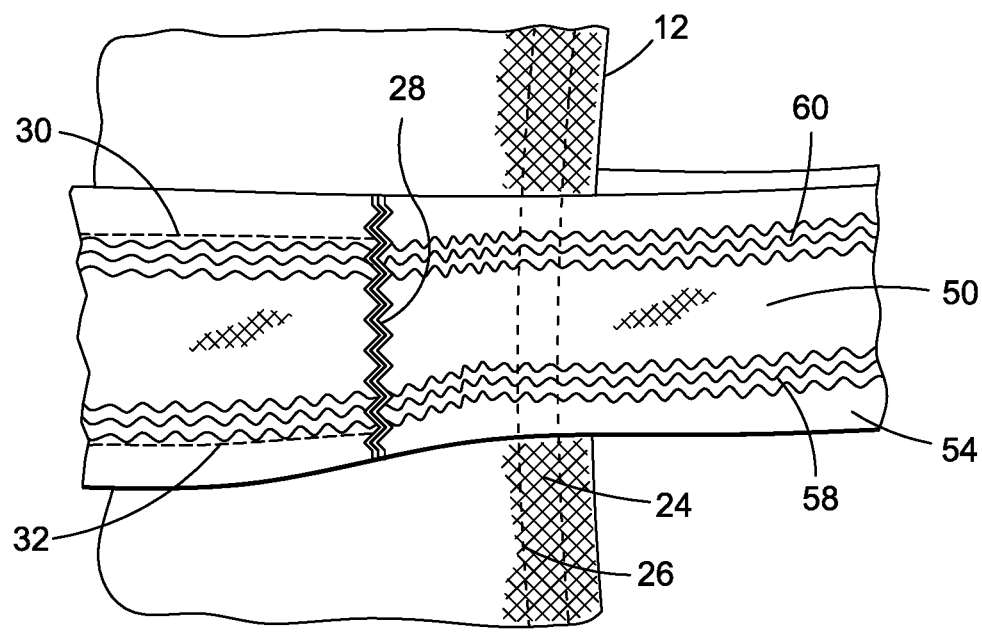
FIG. 3 is an enlarged view of a top end of the ballast bag of FIG. 1.

FIG. 3 is an enlarged view of a top end of the ballast bag of FIG. 1. As shown in FIG. 3, the strap 50 is attached to the ballast bag 10 via seams 30, 32. More specifically, and outer seam 32 is disposed outside the outer non-slip band 58 and an inner seam 30 is disposed inside the inner non-slip band 60. The seams 30, 32 provide a secure connection between the strap 50 and the ballast bag 10.

After filler material 40 (FIG. 5) is inserted into the bag 10, the bag 10 is closed via seams 24, 26. The double seams 24, 26 provide extra protection against any leakage from the bag 10. Due to the use of ballast bags in aerospace application, it is important for the top end 12 to be securely closed by the seams 24, 26 to prevent exposure of aircraft or aircraft components to FOD from the filler material 40. The double seams 24, 26 are formed with the straps 50 already in place. Thus, the double seams 24, 26 also provide another connection point for the straps 50 with the ballast bag 10. The straps 50 on each of the rear and front sides 20, 22 are connected together at the double seams 24, 26 providing stability to the handles 54, 56.

A reinforcing seam 28 is provided along the strap 50 parallel to the end 12 and seams 24, 26. The reinforcing seam 28 provides added strength to the bag 10 for when the bag 10 is lifted via the handles 54, 56.

Figure 4:
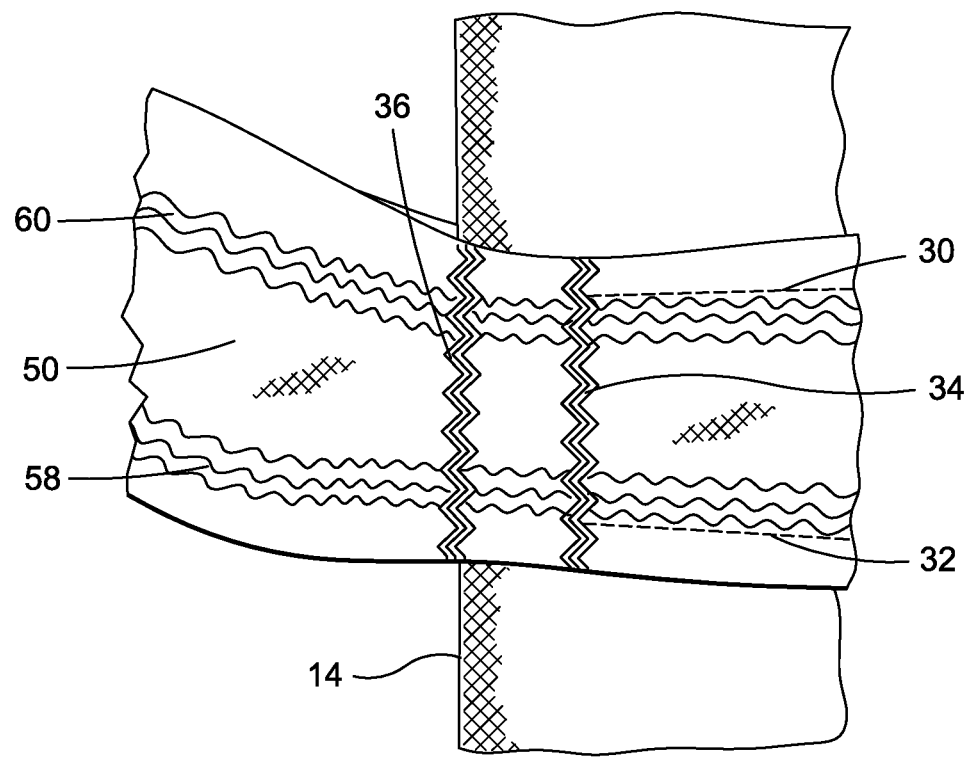
FIG. 4 is an enlarged view of a bottom end of the ballast bag of FIG. 1.

FIG. 4 is an enlarged view of a bottom end of the ballast bag of FIG. 1. As shown in FIG. 4 a first reinforcing seam 34 is provided on the strap 50 parallel to the bottom end 14, similar to the reinforcing seam 28 near the top end 12 shown in FIG. 3. A second reinforcing seam 36 is provided adjacent to the end 14 to connect the straps 50 on the rear and front sides 20, 22 together. The reinforcing seams 34, 34 provide added strength to the bag 10 for when the bag 10 is lifted via the handles 54, 56.

Figure 5:
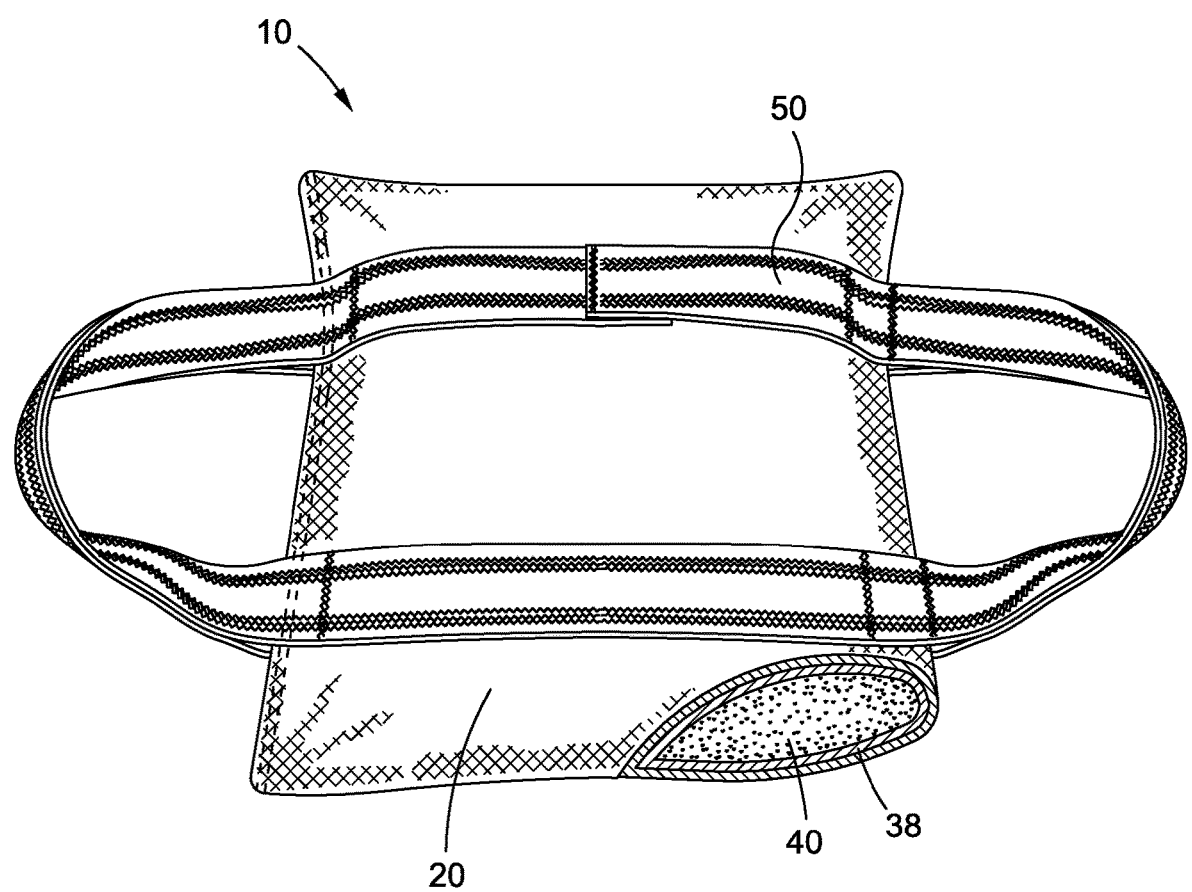
FIG. 5 is a cut-away view of the ballast bag of FIG. 1.

FIG. 5 is a cut-away view of the ballast bag of FIG. 1. As mentioned above, it is critical that personnel utilizing the ballast bag 10 do not unintentionally introduce FOD into an area proximate to aircraft or aircraft components. Accordingly, the ballast bag 10 is provided with at least one internal layer 38. The internal layer 38 is preferably formed with a contrasting color as compared to the exterior of the ballast bag 10. The contrasting color of the at least one internal layer 38 allows personnel utilizing the ballast bag 10 to easily observe wear in the exterior of the ballast bag 10. When the contrasting color of the at least one internal layer 38 can be seen through the exterior layer, personnel utilizing the ballast bag 10 can take the bag out of service before the ballast bag 10 is at risk of introducing FOD to an area where there are aircraft or aircraft components.

As shown in FIG. 5, the ballast bag 10 comprises a filler material 40. The filler material provides weight to the ballast bag 10 so that, for example, the ballast bag 10 may act as a portable ballast for an aircraft. The filler material 40 may include one or a combination of material such as shot, such as steel shot, sand, fine gravel, etc.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A ballast bag comprising:
    a bag body comprising a first end and a second end, a first side and a second side, and a front side and a rear side, the bag body being formed from a single piece of material that is folded along the first side and is connected together along the second side and the first and second ends, and the bag body further comprising at least one internal layer formed from a contrasting color from an external layer of the bag body;
    a first strap connected to the front side of the bag body, the first strap formed from a single strap with ends of the first strap overlapping one another on the front side of the bag body and extending from the ends in both directions in a first line parallel to the first and second sides and past the first and second ends of the bag body and returning to extend along the front side of the bag body in a second line parallel to the first line, the first strap forming a handle on each of the first and second ends of the bag body with the portion of the strap extending past the first and second ends of the bag body;
    a second strap connected to the rear side of the bag body, the second strap formed from a single strap with ends of the second strap overlapping one another on the rear side of the bag body and extending from the ends in both directions in a first line parallel to the first and second sides and past the first and second ends of the bag body and returning to extend along the rear side of the bag body in a second line parallel to the first line, the second strap forming a handle on each of the first and second ends of the bag body with the portion of the strap extending past the first and second ends of the bag body, the handles of the second strap and the handles of the first strap being the same size to form a double handle on each of the first and second ends of the bag body; and
    filler material disposed within the bag body.

2. The ballast bag of claim 1, wherein each of the first and second strap comprises one or more bands of embedded non-slip material extending along the length of the first and second strap.

3. The ballast bag of claim 2, wherein the one or more bands of embedded non-slip material comprises an inner band and an outer band extending along the length of the first and second strap.

4. The ballast bag of claim 3, wherein the strap is formed from a polypropylene material and the inner and outer bands are comprised of rubber.

5. The ballast bag of claim 4, wherein the first and second strap each has dimensions of 1.5 inches wide and 47.5 inches long.

6. The ballast bag of claim 2, wherein the first and second strap are connected to the front and rear sides via stitching that is disposed on an outer side of each of the inner and outer band of embedded non-slip material.

7. The ballast bag of claim 6, wherein the first strap and the second strap are sewn together at the first and second ends of the ballast bag.

8. The ballast bag of claim 7, further comprising reinforcing seams connecting the first and second straps to the front and rear sides of the ballast bag, the reinforcing seams being disposed perpendicular to the inner and outer bands and parallel to the first and second ends adjacent to the first and second ends.

9. The ballast bag of claim 1, wherein the filler material is inserted in the first end, and a double seam is provided along the first end to close the first end.

10. A ballast bag comprising:

a bag body comprising a first end and a second end, a first side and a second side, and a front side and a rear side;

a first strap connected to the front side of the bag body, the first strap forming a loop in two parallel lines along the front side of the bag and a handle extending past each of the first end and the second end of the bag;

a second strap connected to the rear side of the bag body, the second strap forming a loop in two parallel lines along the rear side of the bag and a handle extending past each of the first end and the second end of the bag, the handles of the second strap and the handles of the first strap being the same size to form a double handle on each of the first and second ends of the bag body; and filler material disposed within the bag body, the first and second strap each comprising an inner band and an outer band of embedded non-slip material extending along the length of the first and second strap, the first and second strap being connected to the front and rear sides of the bag body via stitching that is disposed on an outer side of each of the inner and outer bands of embedded non-slip material, the first strap and the second strap being sewn together at the first and second ends of the bag body, and reinforcing seams connecting the first and second straps to the front and rear sides of the ballast bag, the reinforcing seams being disposed perpendicular to the inner and outer bands and parallel to the first and second ends adjacent to the first and second ends.

11. The ballast bag of claim 10, wherein the bag body is formed from a single piece of material that is folded along the first side and is connected together along the second side and the first and second ends.

12. The ballast bag of claim 11, further comprising at least one internal layer formed from a contrasting color from an external layer of the bag body.

13. The ballast bag of claim 10, wherein the first and second straps are each formed from a single strap with ends of the first and second strap overlapping one another on the front side and rear side of the bag body, respectively.

14. The ballast bag of claim 13, wherein the first and second straps are formed from a polypropylene material and the inner and outer bands of embedded non-slip material are comprised of rubber.

15. The ballast bag of claim 13, wherein the first and second strap each has dimensions of 1.5 inches wide and 47.5 inches long.

16. The ballast bag of claim 10, wherein the filler material is inserted in the first end, and a double seam is provided along the first end to close the first end.

17. The ballast bag of claim 10, wherein the shape of the ballast bag is square.

18. The ballast bag of claim 17, wherein the first and second sides and the first and second ends have a length of twelve inches, and the parallel lines of the loops formed by the first and second straps are spaced two and a half inches from the first and second sides, respectively.

* * * * *